United States Patent

[11] 3,556,357

| [72] | Inventor | Cecil Robert Montgomery Graham<br>Killara, Sydney, New South Wales,<br>Australia |
|---|---|---|
| [21] | Appl. No. | 784,861 |
| [22] | Filed | Dec. 18, 1968 |
| [45] | Patented | Jan. 19, 1971 |
| [73] | Assignee | Samuel Taylor Pty, Limited<br>Gore Hill, New South Wales, Australia<br>a corporation of New South Wales, Australia<br>Australia |
| [32] | Priority | Dec. 18, 1967 |
| [33] | | Australia |
| [31] | | 31298/67 |

[54] SEAL FOR AEROSOL CONTAINER INCLUDING FLEXIBLE GASKET PERMITTING FILLING OF CONTAINER THROUGH SEAL
7 Claims, 6 Drawing Figs.

[52] U.S. Cl. .................................................. 222/402.22
[51] Int. Cl. ...................................................... B65d 83/00
[50] Field of Search .......................................... 222/402.22,
402.24, 402.21, 402.11, (Inquired)

[56] References Cited
UNITED STATES PATENTS

| 3,180,374 | 4/1965 | Muller | 222/402.24X |
| 3,391,834 | 7/1968 | Focht | 222/402.24 |

*Primary Examiner*—Stanley H. Tollberg
*Attorney*—McGlew and Toren

ABSTRACT: A seal, for an aerosol container having a cap with a central aperture therein and a tubular stem extending through the aperture with clearance, includes a gasket of resiliently deformable material closely fitting around the stem and having an interference fit within the cap. The outer surface of the gasket engages the inner surface of the cap in an annular contact zone surrounding the stem, and a flange on the stem engages the inner surface of the gasket. Resilient means within a shell within the container yielding urge the flange toward the gasket. The outer gasket surface is formed with radial grooves which are continued along the circumferential periphery of the gasket to the inner surface of the latter, and the radially inner ends of these grooves are interconnected by an annular groove between the radially inner ends and the annular contact zone.

PATENTED JAN 19 1971  3,556,357

INVENTOR
CECIL ROBERT MONTGOMERY GRAHAM

BY McGlew and Toren
ATTORNEYS 3,556,357

SEAL FOR AEROSOL CONTAINER INCLUDING FLEXIBLE GASKET PERMITTING FILLING OF CONTAINER THROUGH SEAL

SUMMARY OF THE INVENTION

This invention relates to closures of aerosol containers of the kind having a valve with a tubular stem passed with clearance through an aperture in the container cap, the stem carrying at its outer end the conventional head and nozzle whereas its inner end is provided with a flange. The edge of this flange, which acts as the valve member proper, engages, from within the container, the "inner" surface of a gasket which seals the container aperture and which resiliently and tightly surrounds the stem.

More especially this invention is concerned with the particular type of closure, in the above-mentioned category, in which the peripheral portion of the gasket overlies the open end of a chamber or shell which accommodates a spring or other resilient means which normally retain the valve member proper in its closing position. The open end of the chamber faces the inner surface of the container cap, and the sealing gasket is interposed between that inner cap surface and the edge or rim of the chamber end. This edge or rim may be radially widened to provide an adequate support for the gasket, and is in sealing engagement with the gasket due to crimping pressure applied to the cap during the assembly of the container with its valve.

As stated above, the gasket—which is preferably made of polyurethane or some other moldable elastomer—is normally engaged by the flange on the inner end of the stem which, in the normal position of the stem, does not permit any flow of liquid under the pressure of the propellant within the container, from the interior of the container, past the flange and through a metering hole or other orifice, into the tubular stem and thence through the nozzle into the ambient atmosphere. Only if the stem is either tilted, or pressed inwardly, during the use of the container, by finger pressure, the flange is temporarily at least partly detached from the gasket and some liquid is then allowed to escape from the container through the orifice, the stem and nozzle.

The object of this invention is to provide a novel gasket of the type above referred to, which—while providing a perfect seal of the container around the stem, both during spraying and while at rest—additionally enables pressure filling of the container with liquid propellant around the stem and, consequently, much more rapidly and efficiently than by conventional methods which enable pressure filling to be effected only through the stem and, therefore, at a comparatively slow rate.

According to the invention the peripheral edge portion of the "outer" gasket surface, which faces the inner surface of the container cap, is formed with a number or series of preferably radial, groovelike recesses. These recesses are continued across the circumferential edge of the gasket right to the opposite or inner gasket surface. The radially inner ends of the radial, groovelike recesses are interconnected by a circular groove formed in the outer surface of the gasket, there being an adequate radial distance between the radially inner edge of said circular groove and the radially inner edge of the aperture in the cap through which the stem is passed. Due to the sealing pressure, which is normally exerted upon the gasket by the above-mentioned spring or by equivalent resilient means, via the flange on the stem, and, besides this, by the propellant itself, the central area of the outer gasket surface bounded by said circular groove therefore provides, with the inner surface of the cap, an adequate sealing effect—except during the pressure filling of the container, as will be understood from the following description.

Although by the provision of the substantially radial recesses and of the circular groove, the contact area between the gasket and the inner side of the container cap is reduced in size, it has been found that it is nevertheless sufficiently large to provide the required sealing effect, during spraying as well as when the filled aerosol container is at rest. In actual fact, the sealing effect may be even more reliable if, according to a further development of the invention, a closed annular rib is provided around the center hole of the gasket on the surface facing the cap, as thereby the specific contact pressure between the gasket surface and the inner side of the container cap is very considerably increased.

During pressure filling of the container, however, which is carried out under high pressure within a gassing head brought into sealing engagement with the outside of the pedestal for the container cap, that pressure acts on the radially innermost portion of the gasket, which surrounds the stem, and forces the central part of the gasket away from the container cap, thereby opening a substantially annular disc-shaped passage for the propellant gas between the gasket and the inner wall of the cap. This passage enables the gas to flow in a radially outward direction from the center of the gasket into the circular groove and from the latter via the substantially radial recesses and the grooves in the peripheral edge of the gasket into the peripheral part of the container cap crimped over the neck or the like of the aerosol container.

Even with existing constructions of aerosol valves, there is, as a rule, some clearance between the outer surface of the chamber or shell and the crimped-on part of the container cap, as there is normally no need for an absolutely tight fit of the cap on said chamber, the gasket itself providing an adequate seal even without such a precision fit.

Due to such clearance, the propellant is made to enter the interior of the container between the gasket and the cap, while the central part of the former is depressed, and between the inner wall of the container cap and the outer wall of said chamber or shell, past at least some portion or portions of the crimp formed in the container cap.

In some cases, particularly for use in connection with push-down valves, it may be desirable to give the gasket according to the invention an increased flexibility in its central portion on which the filling pressure acts in the first place. Such flexibility can be given to the gasket, for instance, by forming the central part to a reduced thickness in the molding process, e.g. by the formation of a central cavity on the inner side of the gasket. In the latter case, it may be advisable to form a tubular extension in the center of the molded gasket, such tubular extension extending either outwardly from, or inwardly into, the container, or in both directions. The formation of such a tubular extension improves the seal of the gasket to the stem and at the same time ensures also an improved centering of the stem.

Thus in the seal, according to the invention, for an aerosol container comprising in combination: a cap with an aperture therein, a tubular stem passed with clearance through said aperture, a gasket of resiliently deformable material having an aperture which closely fits around said stem, which is an interference fit within said cap and one surface—the outer surface—of which engages the inner surface of the container cap throughout an annular contact zone surrounding said tubular stem, a flange provided on said stem for engagement with the opposite—inner—side of the gasket, a shell within the container, and resilient means accommodated within the shell which yieldingly urge the flange towards the gasket, the shell having an open end surrounded by a rim which faces the inner side of the gasket the peripheral zone of which overlies the rim throughout its circumference; the gasket is characterized in that its outer surface is provided in its peripheral zones with a number of substantially radially extending groovelike recesses which are continued across the circumferential edge of the gasket right to the inner gasket surface, and in that the radially inner ends of the groovelike recesses are interconnected by an annular groove formed in the outer gasket surface between the inner ends and said annular contact zone.

In one embodiment, the annular contact zone is constituted by the area which extends between the central aperture of the gasket and the annular groove, or by a substantial part of this area.

In a preferred embodiment, the contact zone is constituted by an annular rib which projects from the outer surface of the gasket, the surface portion between this rib and the aperture of the gasket receding from the inner surface of the cap in the assembled seal.

If so desired, the central portion of the gasket around the aperture of the latter may be made to a reduced thickness in the molding process, e.g. by the formation of a central cavity on the inner side of the gasket.

In order to describe the invention more particularly, reference is made to the accompanying drawing which, by way of example only, illustrates some embodiments of the invention and wherein.

Figure 1:
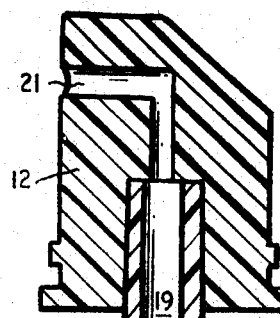
FIG. 1 shows in longitudinal section a preferred construction of the seal assembly.
Figure 3:
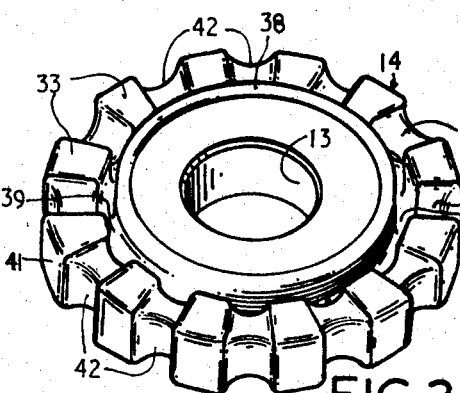
FIG. 3 is a perspective view of the gasket shown in FIG. 2.

FIG. 1 illustrates the invention as applied to a valve assembly similar to that shown in FIG. 3 of the drawing which accompanies the copending Pat. application Ser. No. 771,567. Like other valve assemblies for use on aerosol containers, this assembly comprises a tubular stem 10 with a flange 11 at one end—the inner end—thereof, and with a spray head 12 attached to its opposite—outer—end. The stem 10 is a tight fit in the central hole 13 of a substantially disclike gasket 14 of rubber or other elastomeric material placed in the cavity of a cap 15 which forms a part of the container closure and, more particularly, of the container top 16. The cap 15 has a central aperture 17 of a diameter larger than that of the central hole 13 of the gasket 14, the tubular stem 10 being passed with clearance through the aperture 17.

As in various other valve assemblies for the purpose set forth, the surface of the flange 11 facing the gasket 14 is cupped, i.e., recedes from the inner surface or underside of the gasket 14 to form an annular space 18 around the stem 10.

A passage is provided between the annular space 18 and the hollow interior 19 of the stem 10, the passage allowing the contents of the container 20 to escape from the latter under the action of the propellant contained in the aerosol and to flow from the annular space 18 via the passage and the interior 19 into the nozzle 21 provided in the spray head 12, and thence into the surrounding atmosphere, whenever the spray head 12 together with the stem 10 is either tilted within the aperture 17 by finger pressure applied to said head, or is pushed inward into the container by such finger pressure. As is well known, by this tilting action or by such inward displacement of the stem 10 the annular space 18 is temporarily connected with the interior of the container 20 so as to allow an escape of the aerosol from the container through the nozzle 21 to take place.

In FIG. 1 of the drawing the passage interconnecting the annular space 18 within the cupped flange 11 with the hollow interior 19 of the stem 10 is constituted by a hole 22 in the flange 11 and a duct 23 formed in the underside or inner surface of the flange 11 both arranged relative to the interior 19 of the stem 10 in the manner shown and explained in the specification and drawing of Pat. application Ser. No. 771,567. It is emphasized, however, that this particular interconnection does not form a part of the present invention and therefore the passage connecting the annular space 18 surrounding the stem 10 and the interior of the tubular stem 10 could be constructed differently, e.g., as in prior art, such as illustrated, for instance, in U.S. Pat. Nos. 2,881,808 and 3,098,589.

The valve assembly also includes a shell 24 preferably made of thermoplastic material, the open end of which is surrounded by a bead 25, whereas its closed bottom portion 26 is provided centrally with a tubular socket 27 for the attachment thereto of a dip tube 28 which extends close to the bottom (not shown) of the aerosol container. The aerosol can enter the shell 24 under the action of the pressure of the propellant via the dip tube 28 and the socket 27 whenever the stem 10 is displaced in the aperture 17 of the cap 15 either by tilting or by depressing it, so that some aerosol can escape from the annular space 18 in the outer surface of the flange 11 as described above. Below the bead 25, the cylindrical wall of the shell 24 is formed in its outer surface with an annular shoulder 29. The cylindrical wall 30 of the cap 15 is crimped after the shell 24 has been inserted therein, as shown, the crimps 31 produced in the wall 30, which engage the shoulder 29, thus forcing the rim 32 of the open shell end upon the peripheral portion 33 of the gasket 14. This arrangement of the shell within the cap is likewise conventional.

The shell contains resiliently deformable means which, on release of finger pressure applied to the tilted or otherwise displaced stem 10 with its flange 11, restore these parts to their normal position shown in FIG. 1, in which the edge of the cupped flange engages the inner side of the gasket 14 so that further escape of aerosol from the container 20 into the nozzle 21 is prevented. As shown, these resilient means may be constituted, for example, by a cap-shaped element 34 containing a seal 35 of rubber or other elastomeric material which engages the underside of the flange 11, and a thin walled dome 36 with apertures 37 therein arranged above the outlet from the socket 27 and engaged by the resilient bottom portion of the element 34. Alternatively, however, the resiliently deformable means may include a metal spring, arranged within the shell as illustrated for instance in FIG. 1 of the drawing forming part of the copending application Ser. No. 771,567, and in other prior art.

In the preferred embodiment of the invention, the gasket 14 is formed in its upper surface with an annular rib 38, with an annular groove 39 which surrounds the rib 38, and with a number of grooves 40 which extend substantially radially outward from the annular groove 39, the radial grooves 40 being followed in the outer circumferential surface 41 of the gasket 14 by peripheral grooves 42 which extend across the substantially cylindrical surface 41 right to the underside or inner surface 43 of the gasket 14. The peripheral part 33 of the gasket 14, which is subdivided by the radial grooves 40 and the peripheral grooves 42, is urged by the bead 25 of the shell 24 towards the inner side of the cap 15, so that the parts of the circumferential gasket portion 33 are made to fit closely into the cap 15.

There is a clearance space 44 between the outer surface of the bead 25 and the inner side of the wall 30 of the cap. Owing to this clearance, passages 45 are formed in cylindrical wall 30 and the outer surface of the shell 24 between consecutive crimps 31.

The construction and the design of the gasket 14 as described above and the coaction of that gasket with the shell 24 and the cap 15, not only ensure a perfect seal of the container around the stem 10, both during spraying and while at rest, but also enable pressure filling of the container around the stem 10, at a considerably increased rate, and more efficiently, than known methods by which pressure filling can be carried out only through hollow stem itself. This will be understood when taking into account that, when the gassing head of the pressure filling apparatus (not shown) is brought into engagement with the outside of the container top 16, the very considerable pressure within the gassing head, entering the container—around the stem 10—through the aperture 17 in the cap 15, acts immediately upon the gasket 14 and effectively compresses the central portion of the latter. Thereby the liquid under pressure is made to pass between the depressed rib 38 and to enter the container through the radial grooves 40, the axial grooves 42, the clearance 44 around the bead 25 of the shell 24 and the passages 45 between consecutive crimps 31 formed in the cylindrical wall portion 30 of the cap 15. The cross-sectional area passed by the entering liquid and propellant, which is determined approximately by the total cross section of the radial grooves 40 of the axial grooves 42 and of the passages 45, largely exceeds the cross section available to the liquid flow during pressure filling in known valve assemblies of the type above referred to, which as a rule is determined by the narrowest cross section available inside the spray head and/or the displaceable stem.

Figure 5:
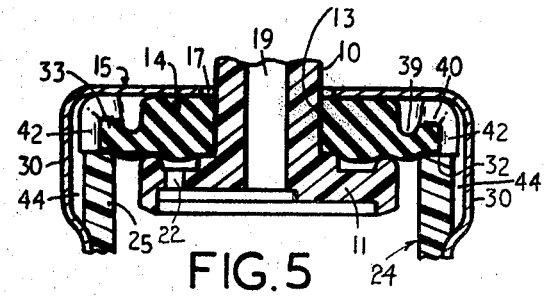
FIG. 5 is a longitudinal section showing another embodiment of the seal wherein the contact zone between the gasket and the inner surface of the cap is constituted by the entire outer gasket surface between the central aperture of the latter and the annular groove formed in the area surrounding the aperture.
Figure 2:
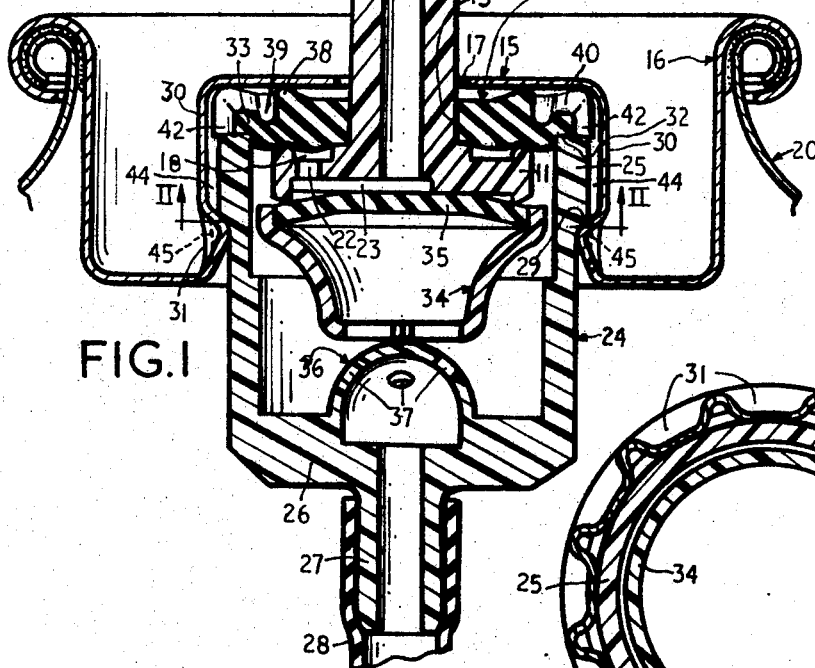
FIG. 2 is a cross-sectional view taken along the line II-II of FIG. 1.
Figure 2:
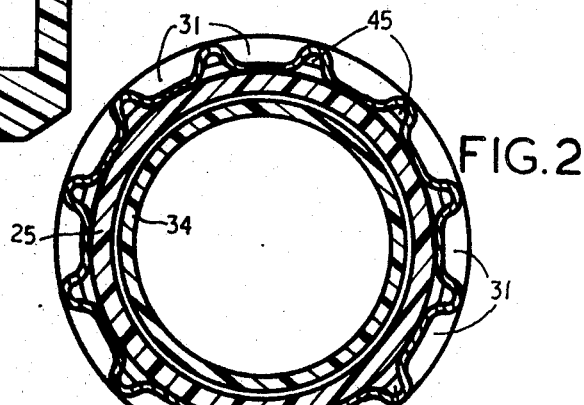

In a modified form of the gasket according to the invention shown in FIG. 5, there is no annular rib on the outer surface of the gasket 14 between the central hole 13 in which the stem 10 is a tight fit and the annular groove 39 provided in the outer surface at a distance from the central hole. Consequently, the entire zone of the outer gasket surface surrounded by the annular groove 39 is normally made to engage the inner wall of the cap 15 under the pressure prevailing within the shell 24, at a specific pressure per unit of that contact zone which thus is normally smaller than the specific pressure exerted upon the rib 38 in the embodiment shown in FIG. 1. In all other aspects the function of the gasket 14 shown in FIG. 5 corresponds to that of the gasket in the first-described embodiment.

Figure 6:
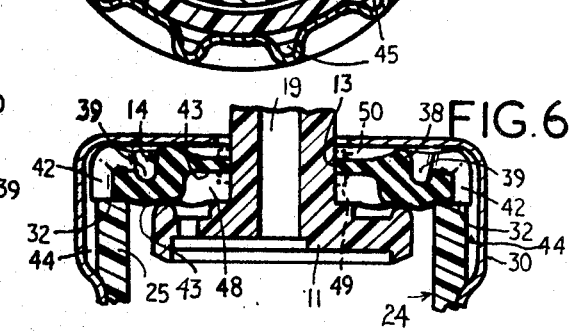
FIG. 6 is a view similar to FIG. 5 showing a modified construction of the gasket.
Figure 4:
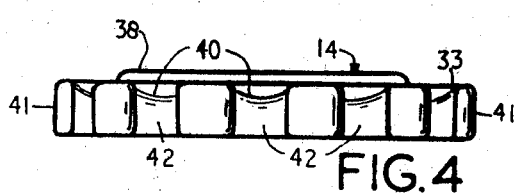
FIG. 4 shows the same gasket in side elevation.

In the further modified embodiment of the gasket shown in FIG. 6 of the accompanying drawing, the wall thickness of the gasket 14 in the area between the central hole 13 and the rib 38 is reduced by the formation in the underside 43 of the gasket of a cavity 48. Thereby an increased flexibility can be given to the gasket which may be particularly valuable for use in connection with pushdown valves. In order to increase the tight fit of the gasket 14 on the stem 10 a tubular extension 49, such as indicated in dotted lines in FIG. 6, may be provided in this case on the underside of the gasket, the extension 49 projecting inwardly into the aerosol container. Alternatively—or additionally to the tubular extension 49—another tubular extension 50, likewise shown in dotted lines in FIG. 6, may project around the stem 10 from the outer surface of the gasket 40 towards the aperture 17 in the cap 15.

While specific embodiments of the invention have been shown and described in detail to illustrate the application of the principles of the invention, it will be understood that the invention may be embodied otherwise without departing from such principles.

I claim:

1. A seal for an aerosol container, the container comprising: a cap with a central aperture therein; a tubular stem passed with clearance through said aperture; a gasket of resiliently deformable material which closely fits around said stem, is an interference fit within said cap and the outer surface of which engages the inner surface of the container cap throughout an annular contact zone surrounding said tubular stem; a flange provided on said stem for engagement with the opposite inner surface of said gasket; a shell within said container; and resilient means accommodated within said shell which yieldingly urge the flange towards said gasket, the shell having an open end surrounded by a rim which faces the inner side of the gasket the peripheral zone of which overlies said rim throughout its circumference, the seal being characterized in that the outer gasket surface is provided with a number of substantially groovelike recesses which are continued across the circumferential edge of the gasket right to the inner gasket surface, and in that the radially inner ends of said groovelike recesses are interconnected by an annular groove provided in the outer gasket surface between the radially inner ends of said groovelike recesses and said annular contact zone.

2. A seal as claimed in claim 1, wherein said contact zone is constituted by the area of the outer gasket surface between the central aperture in said gasket and the annular groove provided in the outer gasket surface.

3. A seal as claimed in claim 1, wherein said contact zone is constituted by an annular rib which projects from the outer surface of said gasket between said central aperture and the annular groove provided in the outer gasket surface, the area of said surface between said rib and said central aperture receding from the inner surface of said cap in the assembled seal.

4. A seal as claimed in claim 2, wherein a cavity is formed in the inner surface of the gasket around the central aperture thereof for increasing flexibility of the gasket.

5. A seal as claimed in claim 1, wherein said contact zone is constituted by the area of the outer gasket surface between the central aperture in said gasket and the annular groove in the outer gasket surface, a cavity being formed in the inner surface of the gasket around said central aperture for increasing the flexibility of the gasket, and a tubular extension being provided on the underside of the gasket around the central hole of the latter, said tubular extension projecting inwardly into the aerosol container in the assembled seal.

6. A seal as claimed in claim 4, wherein a tubular extension is provided on the outer side of the gasket around the central hold of the latter, said tubular extension projecting outwardly from the aerosol container in the assembled seal.

7. A seal as claimed in claim 5, wherein a further tubular extension is provided on the outer side of the gasket around the central hole of the latter.